Oct. 15, 1957  E. C. BOPF  2,809,573
HITCH CONTROL MEANS FOR VEHICLES OR IMPLEMENTS
Filed Aug. 10, 1951  3 Sheets-Sheet 1

INVENTOR.
EDWARD C. BOPF
BY
ATTORNEYS

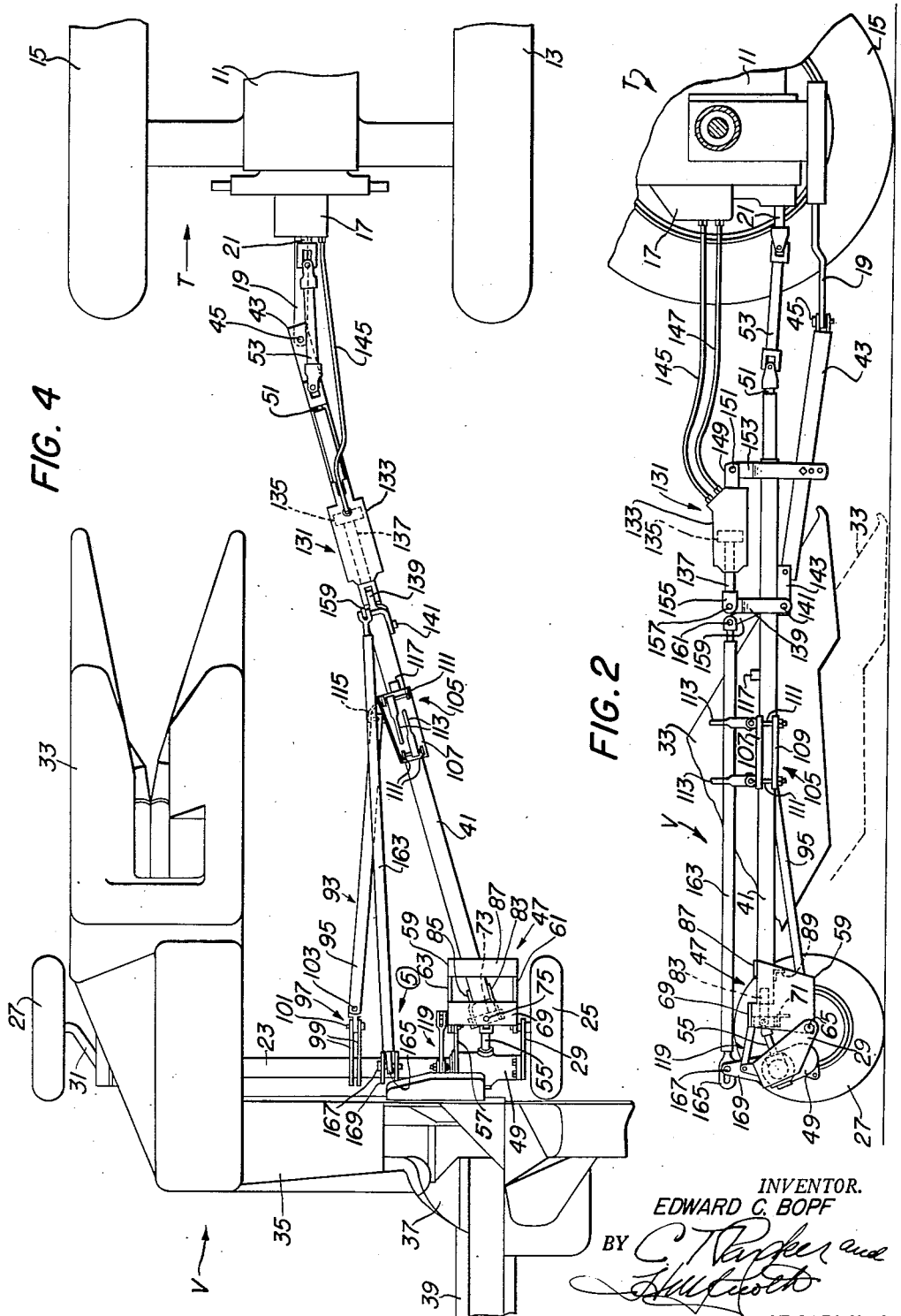

Oct. 15, 1957  E. C. BOPF  2,809,573
HITCH CONTROL MEANS FOR VEHICLES OR IMPLEMENTS
Filed Aug. 10, 1951  3 Sheets-Sheet 3
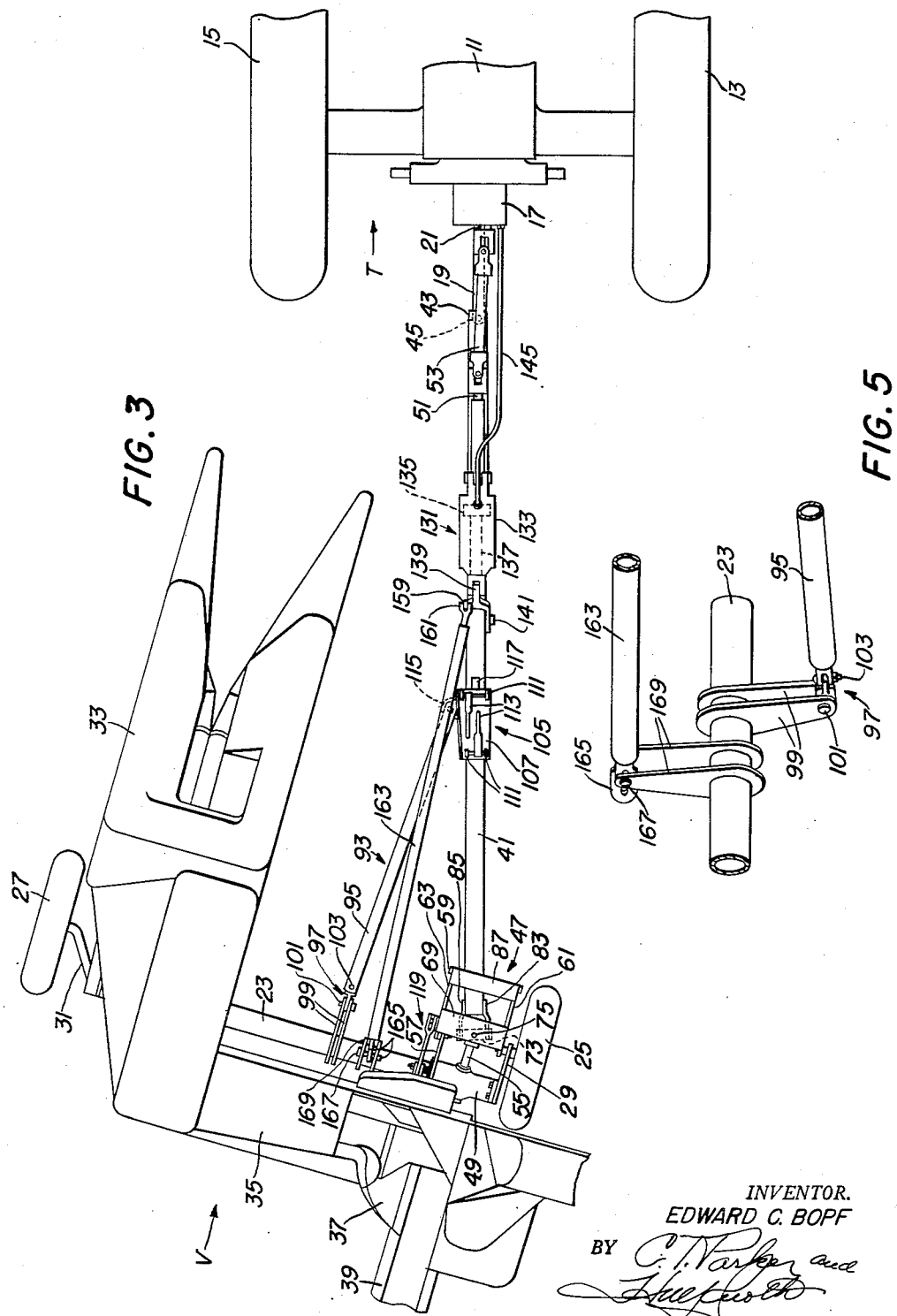
INVENTOR.
EDWARD C. BOPF
BY
ATTORNEYS United States Patent Office 2,809,573
Patented Oct. 15, 1957

2,809,573

HITCH CONTROL MEANS FOR VEHICLES OR IMPLEMENTS

Edward C. Bopf, Des Moines, Iowa, assignor to Deere Manufacturing Co., Dubuque, Iowa, a corporation of Iowa Application August 10, 1951, Serial No. 241,285

12 Claims. (Cl. 97—46.27)

This invention relates broadly to hitch means and more particularly to means for controlling the relationship between the hitch and frame parts of vehicles or implements. Still more particularly, the invention pertains to control means for securing selected positions of adjustment of a pair of relatively movable frame parts in two different phases.

A typical instance in which the invention finds pronounced utility is in a towed corn picker or harvester used with and trailed behind an agricultural tractor. A conventional corn picker of the one-row type ordinarily comprises a transverse frame having wheels at its opposite ends and provided with a forwardly extending draft tongue by means of which the picker frame is connected to the drawbar of a source of propelling power such as a tractor. It is conventional to trail the picker in laterally offset relationship behind the tractor so that the picker will operate on a row of corn offset laterally from the wheel tracks at one side of the tractor, so that the proximate tractor wheel does not run over the row of corn being picked. In most instances, the offset of the picker relative to the tractor will be to the left. In view of this arrangement, the over-all width of the unit comprising the tractor and picker is considerably increased, at least to such an extent that it is not convenient to tow the picker in offset relationship over most roads and highways. Therefore, it is expedient to provide for lateral adjustability of the picker frame relative to the tongue so that the picker may, while being towed for transport, trail directly behind the tractor, whereby the over-all width of the unit is reduced to the over-all width of the picker or tractor, whichever is wider. Manually settable apparatus of the character just described is not unconventional.

As an adjunct to the foregoing, it is conventionally desirable to adjust the picking mechanism of the picker relative to the ground. The relationship between the picker and its draft tongue for accomplishing this result is normally afforded by a pivot on a transverse axis so that the picker frame may be tilted relative to the draft tongue, which results in selective raising or lowering of the picking mechanism. Here again, manually settable and even power-operated means have heretofore been provided.

The foregoing is as far as the prior art has proceeded; that is to say, the two phases of adjustment referred to have heretofore been accomplished separately and, although power-operated means is conventionally available in some cases for tilting the picker or other implement relative to the hitch or tongue, proper advantage has not been taken of the available power for effecting the lateral adjustment.

It is accordingly one of the principal objects of the present invention to utilize force-exerting means for accomplishing both phases of adjustment. Broadly stated, it is an object of the invention to provide, in a mechanism comprising a pair of relatively movable parts, means interconnecting these parts for movement about a pair of angularly related axes, force-exerting means and selectively operative releasable means for constraining the parts for movement first and only about one axis and second and only about the other axis, the same force-exerting means being utilized to accomplish both results. It is specifically an object of the invention to utilize means of this character for accomplishing the aforesaid type of adjustments in implements or vehicles, and this without regard to whether the implement or vehicle is towed or pushed or otherwise propelled by a propelling source.

It is a further object of the invention to utilize as a force-exerting means a fluid motor having an expansible and contractible fluid chamber and a piston movable therein in extension and return strokes and to utilize the extension stroke for one phase of adjustment and the return stroke for another phase of adjustment. It is likewise an object of the invention to utilize a force-exerting means that is removably interconnectible between the parts and to provide locking means for simultaneously connecting the parts against movement about both axes so that the parts may be locked together to facilitate removal of the force-exerting means. This arrangement also facilitates re-installation of the force-exerting means. It is specifically an object to utilize this arrangement in conjunction with a fluid motor of the piston and cylinder type, since in the agricultural field it is desirable that the fluid motor be removable from one implement and for use with another implement, particularly when these implements are successively and separately used in conjunction with a tractor that normally has a power control system of which the fluid motor forms what may be considered an integral part. The invention features also the improvement generally of hitch and control structure of the character referred to, to the end that the structure is simplified for manufacture, production and use.

The foregoing and other important objects and desirable features inherent in and encompassed by the invention will become apparent from the disclosure of a preferred embodiment of the invention as described and illustrated respectively in the following detailed description and accompanying sheets of drawings.

In the drawings,

Figure 1 is a plan view of a tractor and trailing corn picker in operating relationship;

Figure 2 is a side elevational view of the structure shown in Figure 1, but illustrating in full lines the maximum upward tilted position of the frame relative to the hitch and showing in dotted lines a lowered or operating position of the gathering unit;

Figure 3 is a plan view showing the relationship between the tractor and the implement at the end of lateral adjustment of the implement preparatory to the arranging of the implement for transport;

Figure 4 is a plan view showing the tractor and implement in transport relationship;

Figure 5 is an enlarged fragmentary perspective view as seen in the direction of the arrow bearing the encircled numeral 5 in Figure 4;

Figure 6 is a transverse fragmentary sectional view on an enlarged scale as seen along the line 6—6 of Figure 1; and Figure 7 is a fragmentary sectional view on an enlarged scale as seen along the line 7—7 of Figure 1.

The tractor or equivalent source of propelling power is designated generally by the letter T and the implement or vehicle is designated generally by the letter V. That portion of the tractor illustrated in the drawings is typical of the conventional agricultural tractor and comprises a longitudinal body 11 having right- and left-hand traction wheels 13 and 15 and provided centrally of the body at the rear thereof with a valve housing 17 forming part of a power control system typical of the hydraulic systems now used extensively and provided as part of the original or attachment equipment for agricultural tractors, an example of which is disclosed in the U. S. patent to Jirsa et al., 2,532,552.

The tractor further includes a conventional rearwardly extending drawbar 19 above which is a conventional power takeoff shaft 21.

The implement or vehicle shown here is a one-row corn picker including a transverse frame part 23 carried at its opposite ends respectively by right- and left-hand ground-engaging wheels 25 and 27. The wheels are connected respectively to opposite ends of the frame part 23 by depending crank axles 29 and 31. The frame part 23 carries rigidly at the left-hand side thereof a forwardly extending corn-picking means including a gatherer unit 33 centered on and adapted to pick corn from a corn row R. It will be observed that the row R is outside or to the left of the left-hand traction wheel 15 of the tractor T. The left-hand wheel 27 of the picker is to the left of the row R. Consequently, the over-all width of the unit comprising the tractor T and picker V is at least equal to the traverse distance between the left-hand face of the picker wheel 27 and the right-hand face of the tractor wheel 13.

The vehicle V conventionally includes, as it would in the case of a corn picker, a transverse husking mechanism housing 35 which delivers to a hopper 37 at the bottom of a rearwardly and upwardly inclined wagon elevator 39. These details are relatively unimportant here and are mentioned merely for the purposes of briefly completing the disclosure of the particular type of implement or vehicle selected for the purposes of illustration.

The vehicle V is connected to the tractor T by means of a longitudinally extending tongue or hitch part 41 connected at its forward end by a clevis and pin 43 and 45 to the tractor drawbar 19 and connected at its rear to the right-hand end portion of the frame part 23 by universal joint means designated generally by the numeral 47. The clevis and pin connection 43—45 is conventionally articulate; and the universal joint means 47 provides an articulate connection between the hitch part 41 and frame part 23 in a manner to be presently described.

The right-hand portion of the frame part 23 may include a gear housing 49 in which may be contained mechanism (not shown) for transferring power to the various components of the picking mechanism or gatherer unit 33. The draft tongue 41 may be hollow as shown to include or contain a longitudinally extending propeller shaft 51 having a telescopic shaft connection 53 with the power take-off shaft 21 of the tractor. The rear end of the propeller shaft 51 is here shown as having a universal and telescopic connection 55 to the mechanism in the gear box 49.

The crank axles 29 and 31 provide a transverse pivot axis about which the transverse frame part 23 may be tilted to effect raising and lowering of the gatherer unit 33. In addition to the crank axle 29, the frame part 23 carries a second downwardly and forwardly extending rigid part 57. The universal joint means 47 comprises a main yoke 59 having a pair of transversely spaced apart depending legs 61 and 63 connected respectively to the crank axle 29 and depending part 57 by alined pivots 65 and 67. These pivots are coaxial with the transverse axis through the centers of the wheels 25 and 27.

The yoke 59 includes an upper part 69 and a transverse intermediate part 71 between which is carried a collar 73 on vertically alined pivots 75 and 77.

The collar 73 has a pair of transverse pivots 79 and 81 alined on a transverse axis, which axis is, of course, angularly related (here at 90°) to the vertical or upright axis through the pivots 75 and 77. The rear end of the tongue or hitch part 41 is connected by a pair of straps 83 and 85 respectively to the transverse pivots 79 and 81. Likewise, the vertical axis through 75 and 77 is angularly related to the transverse axis through 65 and 67. Thus, the tongue 41 has relative lateral swinging movement as to the frame part 23 about the upright axis 75—77, and also has tilting movement relative to the frame part 23 about the transverse axis 65—67. The tongue 41 is constained for movement vertically with the yoke 59 by means of upper and lower members 87 and 89 preferably forming integral parts of the yoke 59 and spaced ahead of the upper and lower members 69 and 71 previously described. Therefore, the tongue 41 can have only lateral swinging movement at times relative to the yoke 59. Angular movement of the tongue 41 to the right beyond the position shown in Figure 1 is prevented by means of a stop 91 in the form of an angle secured to the lower transverse member 89. The tongue 41 can, of course, swing to the left relative to the frame part 23 so that the position of Figure 3, for example, can be achieved.

Included in the means for controlling the relationship between the hitch and frame parts 41 nad 23 is a first releasable locking or control means 93 and comprising a brace 95 arranged diagonally as respects the frame and hitch parts 23 and 41. Stated otherwise, the diagonal brace 95 provides the third side of a triangle of which portions of the frame and hitch parts provide first and second sides. One apex of this triangle is at the vertical axis coincident with the pivots 75 and 77. Another apex is provided by an articulate connection 97 between the rear end of the brace 95 and a pair of forwardly depending arms 99 rigidly secured, as by welding, to the frame part 23 in laterally offset relationship as respects the universal joint means 47. The articulate connection at 97 includes pivots 101 and 103 lying respectively on transverse and upright axes. The pivot axis through 101 is coincident with the transverse axis through the centers of the wheels 25 and 27 and consequently coincident with the axis through 65—67 that constitutes the interconnection between the yoke 59 and the frame part 23.

The third apex of the triangle comprising the parts 23—41—95 is included in a selectively releasable and connectible device 105 at times slidable lengthwise along the draft tongue or hitch part 41. This device comprises upper and lower plates 107 and 109 connected by clamping means including a plurality of upright eyebolts 111 to the tops of which are connected a pair of cam operating levers 113. The action of the levers 113 is such that they are selectively operative to draw the plates 107 and 109 together or to allow movement of these plates apart, depending upon whether it is desired to clamp or release the device 105 relative to the hitch part 41. The released positions of the levers 113 are shown in Figure 2. The forward end of the brace 95 is articulately connected at 115 to the inner or left-hand side of the device 105. Consequently, when the device 105 is locked in place on the hitch part 41, the hitch and frame parts and the diagonal brace 95 provide a triangle rigid in a horizontal plane, thus locking the frame and hitch parts against relative movement about the upright axis 75—77. When the hitch and frame parts are so locked, the frame parts cannot swing laterally relative to the tongue or hitch part 41. Conversely, when the device 105 is released, the angular relationship between the frame and hitch parts may be adjusted, as will be observed by a comparison of Figures 1 and 3. The hitch part 41 may include a stop 117 against which the device 105 may abut to limit its forward movement relative to the hitch part.

During normal operation of the unit comprising the tractor T and vehicle or implement V, the device 105 will be locked to maintain the selected angular relationship between the frame and hitch parts 23 and 41. As will be described below, the locked relationship by means of the releasable means 93 still permits vertical adjustment or tilting of the frame part relative to the hitch part about the transverse axis on which are alined the centers of the wheels 25 and 27, the pivot 101 and the pivots 65 and 67.

It is normally only during the picking of corn that tilting of the frame part 23 will be desired to accomplish adjustment of the gatherer unit 33 relative to the ground. Therefore, a second releasable locking or control means 119 will normally be released. In the preferred form of releasable means shown, there is provided an upstanding arm or connection element 121 rigidly secured to the frame part 23 as by welding. This arm has its free end provided with a transverse pivot pin 123 disposed at a level in vertically spaced relation to (here upwardly from) the frame part 23 so as to lie above the pivot axis 65—67. Since the arm 121 and the depending crank axle 29 and depending part 57 are rigid relative to each other, a lever arm is established between 123 and 65—67 for effecting tilting of the vehicle about the latter transverse axis. When the device 105, in conjunction with the means 93, is locked, the only relative movement that can occur between the frame and hitch parts 23 and 41 is tilting about the transverse axis just described.

It is a feature of the invention, as set forth above, that the frame and hitch parts may be locked against relative movement about the transverse axis so that relative movement about the upright axis may be independently achieved. For this purpose, the second releasable means 119 includes, in addition to the arm 121, a link means 125 pivoted at one end to the arm 121 by the pivot 123. The other end of the link means 125 carries a transverse pin 127 which is at times receivable by a notched lug 129 rigidly carried at one side 63 of the yoke 59. Figure 7 shows the released position of the link means 125 relative to the notched lug 129. After the frame part 23 is tilted to its maximum raised position about the transverse axis including the pivot 65—67, the link means 125 may be dropped so that the transverse pin 127 enters the notch in the notched lug 129. In this relative position of the parts, the gatherer unit 33 will be raised as shown in Figure 2. The lock established at 127—129 will prevent the gatherer unit from lowering to the dotted-line position shown in Figure 2. This dotted-line position is typical of a normal operating position in which the gatherer unit is at what may be termed its maximum lowered position.

From the description thus far, it may be seen that when the first means 93 is locked, the frame and hitch parts 23 and 41 are constrained for relative movement about only the transverse axis 65—67; and that when the second means 119 is locked and the first means 93 is released the parts 23 and 41 are alternatively constrained for relative movement about only the upright axis 75—77. There are times, of course, when both means 93 and 119 may be locked, as when the components of the unit are adjusted to their transport positions. Other instances will be set forth below.

For the purposes of accomplishing both phases of adjustment—that is, lateral swinging and vertical tilting—the control mechanism includes a force-exerting means or device designated generally by the numeral 131, here in the form of a fluid motor comprising a fluid-expansible and -contractible chamber, included in a cylinder 133, and a piston 135 movable in alternate extending and return strokes to transmit power through a piston rod 137 to a swingable lever 139 fulcrumed at 141 to a bracket 143 below the hitch part 41, which bracket serves also as a connection for the clevis member 43 of the hitch part. The motor cylinder 133 is connected by fluid lines 145 and 147 to the valve housing 17 of the hydraulic system on the tractor. The motor shown is of the two-way type in which the lines 145 and 147 are alternately fluid pressure and return lines.

The cylinder 133 has a forward clevis 149 removably connected by a pin 151 to an upstanding bracket 153 at the forward end of the hitch part 41. The piston rod 137 includes a clevis 155 connected by a removable pin 157 to the upper end of the rearwardly swingable lever 139. Because the pins 151 and 157 are removable, the entire means 131 may be removed from the vehicle and used with other vehicles with which the tractor T is used. Thus, the means 131 may remain a part of the hydraulic system of the tractor, regardless of the vehicle with which the tractor is employed.

The swingable member 139 carries at its upper end a rearwardly extending apertured lug 159 to which is connected by a transverse pin 161 the forward end of a rearwardly extending force-transmitting member 163. This member is constructed to operate in both compression and tension and has its rear end provided with an integral longitudinally slotted portion 165 for connection by a transverse pin 167 to upstanding arm means 169 rigidly secured as by welding to the transverse frame part 23 in laterally offset relationship to the universal joint means 47. Since the arm means 169 extends upwardly from the transverse frame part 23, the connection element 165—167 is at a level vertically spaced above the level of the transverse tilting axis 65—67 and thus constitutes an upright lever arm rigid with the frame part 23 and having the transverse axis 65—67 as its fulcrum. Further, since the arm means 169 is spaced laterally from the universal joint means 47, the portion of the frame 23 between 47 and 169 constitutes a transverse lever arm, also rigid with the frame part 23 and having the upright or vertical axis 75—77 as its fulcrum.

Considered without reference to the releasable locking or control means 93 and 119, the force exerting means 131 is connected by the force-transmitting member 163 between the frame and hitch parts 23 and 41 in such manner as to exert a force tending to move the frame and hitch parts relatively about both transverse and upright axes simultaneously. However, since normally one or the other of the releasable means 93 or 119 will be locked, the results of the transmission of force will be to move the frame and hitch parts relatively about only one of the axes to the exclusion of the other.

*Operation*

In preparation for normal operation of the tractor and vehicle, the tongue 41 will be connected to the tractor drawbar 19 and both releasable means 93 and 119 will be released and the tractor driven forwardly so that the implement trails behind it. If the position of Figure 1 is not automatically achieved by forward travel of the tractor and vehicle, the means 93 may be locked via the device 105 so that force transmitted by the force-exerting means 131 during extension of the piston 135 during part of its stroke will operate through the connection 163 and arm means 169 to tilt the frame part 23 upwardly and rearwardly about the transverse axis 65—67 until it is possible to lock the releasable means 119. The device 105 is then unlocked and continued extension of the piston 135 will then move the frame part 23 rearwardly relative to the hitch part 41 about the upright axis 75—77 so as to increase the angle between the parts 23 and 41. When the position of Figure 1 is achieved, the device 105 may be again locked, thus rigidifying the triangle consisting of the diagonal brace 95 and the included parts of the frame and hitch parts 23 and 41. The releasable means 119 may then be released and the fluid motor operated so that the piston 135 moves on its return stroke to lower the gatherer unit 33 to the desired level above the ground. Since the frame and its parts are locked against relative movement about the upright axis, the fluid motor may be utilized during normal operation of the picker to adjust the level of the gatherer unit as desired. Because of the slot in the portion 165, the gatherer unit may have a limited amount of free or "floating" movement as changes in ground contour are encountered.

When the operator wishes to move from the field out onto a road or highway, in which circumstance he will necessarily desire to decrease the over-all width of the tractor and picker, he will first cause the fluid motor to operate and raise the gatherer 33, and thereby to tilt the frame 23 rearwardly and upwardly to the position of Figure 2, whereupon it is possible to lock the releasable means 119. Therefore, the frame parts are held against relative movement about the tilting axis 65—67 and, after release of the means 93, contraction of the force-exerting means—the return stroke of the piston 135—may be utilized to pull through the force-transmitting member 163 to decrease the angle between the frame and hitch parts 23 and 41, a position that is represented by the illustration in Figure 3.

After achieving the position of Figure 3, the operator then drives the tractor forwardly and the picker will trail directly behind the tractor as shown in Figure 4. Because of the use of a fluid motor, it will not be necessary at all times to lock the device 105, since the hydraulic lock set up in the fluid motor will maintain the trailing position of the implement relative to the tractor. However, the device 105 may be locked, which in conjunction with the locked position of the second releasable means 119, maintains the adjusted positions of the frame and hitch parts so that the force-exerting means 131 may be removed, as for purposes set forth above.

As previously stated, it is an important feature of the invention to simplify in general the construction of vehicles or implements of the character illustrated. In the present case, considerable advantage is taken of parts that are largely conventional in designs of the type here illustrated, it being necessary only to rearrange certain of these parts and combine them in the novel manner described so as to achieve the dual function as noted.

Various other features of the invention not specifically enumerated will undoubtedly occur to those versed in the art, as likewise will numerous alterations and modifications in the preferred embodiment of the invention disclosed, all of which may be achieved without departing from the spirit and scope of the invention as defined in the appended claims.

What is claimed is:

1. In an implement in the form of a trailing vehicle connectible to a draft vehicle and including a transverse, wheeled frame part, a longitudinal hitch part, and universal joint means interconnecting the frame and hitch parts for both relative tilting and relative lateral swinging respectively about transverse and upright axes, the improvement comprising: a first arm rigid on the frame part in laterally offset relation to the universal joint means and having a free end at a level spaced vertically from the universal joint means; a second arm rigid on the frame part substantially in longitudinal alinement with the hitch part; a diagonal brace extending between the frame and hitch parts and selectively lockable and releasable to respectively prevent and permit relative lateral swinging of the frame and hitch parts about the upright axis of the universal joint means; releasable means selectively connectible and disconnectible between the hitch part and the second arm to respectively prevent and permit relative tilting of the frame and hitch parts about the transverse axis of the universal joint means; and force-exerting means connected between the free end of the first arm and a point on the hitch part in longitudinally spaced relation to the universal joint means and selectively controllable to tilt the frame and hitch parts relatively when the diagonal brace is locked and the releasable means is connected and, alternatively, to swing the hitch and frame parts relatively laterally when the diagonal brace is released and the releasable means is connected.

2. In an implement having a transverse frame part, a longitudinal hitch part for connecting the frame part to a source of propelling power, and means inter-connecting the parts for relative movement about an upright axis and also for relative movement about a transverse axis proximate to the upright axis, the improvement comprising: first brace means connected between the parts and forming with said parts a first triangle lying in a plane normal to the upright axis and having said upright axis as an apex; first releasable means associated with the brace means for selectively rigidifying and releasing the first triangle to respectively prevent or permit relative movement of the parts about the upright axis; second brace means connected between the parts and forming with said parts a second triangle lying in a plane normal to the transverse axis and having said transverse axis as an apex: second releasable means associated with the second brace means for selectively rigidifying and releasing the second triangle to respectively prevent and permit relative movement of the parts about the transverse axis; and force-exerting means connected to the hitch part at a point spaced longitudinally from the axes and connected to the frame part at a point spaced both transversely from the upright axis and vertically from the transverse axis to exert a force along a line joining said points for moving the parts relatively about only the transverse axis when the first triangle is rigidified and the second triangle is released and, alternatively, for moving the parts relatively about only the upright axis when the first triangle is released and the second triangle is rigidified.

3. In an implement having a transverse frame part, a longitudinal hitch part for connecting the frame part to a source of propelling power, and means interconnecting the parts for relative movement about an upright axis and also for relative movement about a transverse axis proximate to the upright axis, the improvement comprising: first brace means connected between the parts and forming with said parts a first triangle lying in a plane normal to the upright axis and having said upright axis as an apex; first releasable means associated with the brace means for selectively rigidifying and releasing the first triangle to respectively prevent or permit relative movement of the parts about the upright axis; second brace means connected between the parts and forming with said parts, a second triangle lying in a plane normal to the transverse axis and having said transverse axis as an apex: second releasable means associated with the second brace means for selectively rigidifying and releasing the second triangle to respectively prevent and permit relative movement of the parts about the transverse axis; and selectively expansible and contractible force-exerting means connected to the hitch part at a point spaced longitudinally from the axes and connected to the frame part at a point spaced both transversely from the upright axis and vertically from the transverse axis, said force-exerting means being expansible to exert a force in one direction along a line joining said points for moving the parts relatively about only one axis when one triangle is rigidified and the other triangle is released, and being alternatively contractible to exert a force in the opposite direction along said line for moving the parts relatively about only the other axis when said one triangle is released and said other triangle is rigidified.

4. The invention defined in claim 3, further characterized in that: the force-exerting means comprises a fluid motor including a fluid chamber and a piston movable therein in a successive extending and return strokes, wherein movement of the piston in an extending stroke exerts said force in said one direction and movement of said piston in a return stroke exerts said force in said opposite direction.

5. In an implement having a transverse frame part, a longitudinal hitch part for connecting the frame part to a source of propelling power, and means interconnecting the parts for relative movement about an upright axis and also for relative movement about a transverse axis proximate to the upright axis, the improvement comprising: first and second control means connected between the parts and respectively and alternately effective to constrain the parts at times for relative movement exclusively about the transverse axis and at other times for relative movement exclusively about the upright axis; and selectively expansible and contractible force-exerting means connected to the hitch part at a point spaced longitudinally from the axes and connected to the frame part at a point spaced both transversely from the upright axis and vertically from the transverse axis, said force-exerting means being expansible to exert a force in one direction along a line joining said points for moving the parts relatively about only one axis when one control means is effective, and being alternatively contractible to exert a force in the opposite direction along said line for moving the parts relatively about only the other axis when said other control means is effective.

6. The invention defined in claim 5, further characterized in that: the force-exerting means comprises a fluid motor including a fluid chamber and a piston movable therein in successive extending and return strokes, wherein movement of the piston in an extending stroke exerts said force in said one direction and movement of said piston in a return stroke exerts said force in said opposite direction.

7. In an implement having a transverse frame part, a longitudinally extending hitch part for connecting the frame part to a source of propelling power for travel over the ground, and universal joint means interconnecting the frame and hitch parts and including both upright and transverse pivot axes providing respectively for relative lateral swinging and for relative tilting of the frame and hitch parts, the improvement comprising: brace means articulately connected at one end to the frame part in laterally spaced relation to the universal joint means; first releasable means connecting the other end of the brace means to the hitch part in longitudinally spaced relation to the universal joint means, said releasable means being selectively lockable to the hitch part to brace the hitch and frame parts against lateral swinging and, alternatively, releasable to slide lengthwise of the hitch part to permit relative lateral swinging of the hitch and frame parts; selectively expansible and contractible force-exerting means connected to the hitch part at a point spaced longitudinally from the universal joint means and connected to the frame part at a point spaced both laterally and vertically from said universal joint means, and effective to exert a force in one direction along a line joining said points for tilting the frame and hitch parts relatively when said releasable means is locked; second releasable means normally released but connectible between the frame and hitch parts after relative tilting of the hitch and frame parts to lock the hitch and frame parts against return tilting; and said force-exerting means being effective to exert a force in the opposite direction along said line for swinging the hitch and frame parts laterally relative to each other upon connection of said second releasable means and release of said first releasable means.

8. In an implement having a transverse frame part, a longitudinally extending hitch part for connecting the frame to a source of propelling power for travel over the ground, and universal joint means interconnecting the frame and hitch parts and including both upright and transverse pivot axes providing respectively for relative lateral swinging and for relative tilting of the frame and hitch parts, the improvement comprising: brace means articulately connected at one end to the frame part in laterally spaced relation to the universal joint means; first releasable means connecting the other end of the brace means to the hitch part in longitudinally spaced relation to the universal joint means, said releasable means being selectively lockable to the hitch part to brace the hitch and frame parts against lateral swinging and, alternatively, releasable to slide lengthwise of the hitch part to permit relative lateral swinging of the hitch and frame parts; force-exerting means connected to the hitch part at a point spaced longitudinally from the universal joint means and connected to the frame part at a point spaced both laterally and vertically from said universal joint means, and effective to exert a force along a line joining said points for tilting the frame and hitch parts relatively when said releasable means is locked; second releasable means normally released but connectible between the frame and hitch parts after relative tilting of the hitch and frame parts to lock the hitch and frame parts against return tilting; and said force-exerting means being then effective to exert a force along said line for swinging the hitch and frame parts laterally relative to each other upon connection of said second releasable means and release of said first releasable means.

9. In an implement in the form of a trailing vehicle connectible to a draft vehicle and including a transverse, wheeled frame part, a longitudinal hitch part, and universal joint means interconnecting the frame and hitch parts for both relative tilting and relative lateral swinging respectively about transverse and upright axes, the improvement comprising: a first arm rigid on the frame part in laterally offset relation to the universal joint means and having a free end at a level spaced vertically from the universal joint means; a second arm rigid on the frame part substantially in longitudinal alinement with the hitch part; first releasable means between the frame and hitch parts and selectively lockable and releasable to respectively prevent and permit relative lateral swinging of the frame and hitch parts about the upright axis of the universal joint means; second releasable means selectively connectible and disconnectible between the hitch part and the second arm to respectively prevent and permit relative tilting of the frame and hitch parts about the transverse axis of the universal joint means; and force-exerting means connected between the free end of the first arm and a point on the hitch part in longitudinally spaced relation to the universal joint means and selectively controllable to tilt the frame and hitch parts relatively when the first releasable means is locked and the second releasable means is connected and, alternatively, to swing the hitch and frame parts relatively laterally when the first releasable means is released and the second releasable means is connected.

10. The invention defined in claim 7, in which: the force-exerting means comprises a fluid motor including a fluid chamber and a piston movable therein in successive extending and return strokes, wherein movement of the piston on its extending stroke exerts a force in one direction along the aforesaid line and movement of the piston in its return stroke exerts a force in the opposite direction along said line.

11. The invention defined in claim 10, in which disconnectible means removably connects the motor between the frame and hitch parts, and said first releasable means is re-lockable between the brace means and hitch part to hold the frame and hitch parts in a laterally swung position to provide for removal of the motor via said disconnectible means.

12. In an implement in the form of a trailing vehicle connectible to a draft vehicle and including a transverse, wheeled frame part, a longitudinal hitch part, and universal joint means interconnecting the frame and hitch parts for both relative tilting and relative lateral swinging respectively about transverse and upright axes, the improvement comprising: means on the frame part affording a first connection element in both laterally and vertically offset relation to the universal joint; means on the frame affording a second connection element substantially in longitudinal alinement with the hitch part; first releasable means between the frame and hitch parts and selectively lockable and releasable to respectively prevent and permit relative lateral swinging of the frame and hitch parts about the upright axis of the universal joint means; second releasable means selectively connectible and disconnectible between the hitch part and the second connection element to respectively prevent and permit relative tilting of the frame and hitch parts about the transverse axis of the universal joint means; and force-exerting means connected between the first connection element and a point on the hitch part in longitudinally spaced relation to the universal joint means and selectively controllable to tilt the frame and hitch parts relatively when the first releasable means is locked and the second releasable means is connected and, alternatively, to swing the hitch and frame parts relatively laterally when the first releasable means is released and the second releasable means is connected.

References Cited in the file of this patent

UNITED STATES PATENTS

| | | |
|---|---|---|
| 1,705,892 | Ballert | Mar. 19, 1929 |
| 1,941,670 | Everett | Jan. 2, 1934 |
| 2,442,198 | Dawley | May 25, 1948 |
| 2,452,267 | Schramm | Oct. 26, 1948 |
| 2,472,944 | Furer et al. | June 14, 1949 |
| 2,481,017 | Johnson | Sept. 6, 1949 |
| 2,494,757 | Hansen | Jan. 17, 1950 |
| 2,504,289 | Waterman | Apr. 18, 1950 |